United States Patent [19]
Averbukh

[11] Patent Number: 5,827,405
[45] Date of Patent: Oct. 27, 1998

[54] LASER ISOTOPE SEPARATION BY EXCITATION OF WAVEPACKETS

[75] Inventor: Eliyahu Averbukh, Rehovot, Israel

[73] Assignee: Yeda Research and Development Co., Limited, Rehovot, Israel

[21] Appl. No.: 705,669

[22] Filed: Aug. 30, 1996

[30] Foreign Application Priority Data

Mar. 1, 1996 [IL] Israel ......................................... 117328

[51] Int. Cl.$^6$ ..................................................... B01D 5/00
[52] U.S. Cl. ........................................................ 204/157.2
[58] Field of Search ............................. 204/157.2, 157.22

[56] References Cited

PUBLICATIONS

D.G. Agrashkevich et al. "Optimal Squeezing of Vibrational . . . " J. Chem. Phys. 101 (11) Dec 1994, 9295–9302.
I. Sh. Averbukh et al. "Fractional Revivals . . . " Physics Letters A, vol. 139, No. 9 28 Aug. 1989, 449–453.
I. Averbukh et al. "Optimal Squeezing of Molecular . . . " American Physical Society Physical Review A, Jun. 1993, 5086–5092.
T. Baumert et al. "Femtosecond Pump–Probe Study . . . " Chemical Physics Letters, vol. 191, No. 6, 17 Apr. 1992, 639–644.
R.M. Bowman et al. "Femtosecond Transition–State", Chemical Physics Letters vol. 161, No. 4,5, 1988 pp. 297–302.
E.U. Condon et al. The Theory of Atomic Spectra. "One–Electron Spectra" Chapter V, 112–113, 1957, Cambridge at the University Press.
P.T. Greenland, "Laser isotape separation", Contemporary Physics, 1990, vol. 31, No. 6, pp. 405–424.
M. Gruebele et al. "Femtosecond Temporal . . . " Chemical Physics Letters, vol. 166, No. 5,6, Mar. 9, 1990, 459–469.

U.S. Letoknov, "Laser Separation of Isotopes", Ann. Rev. Phys. 1977, 28 133–59.
V.S. Letokhou, Laser Isotope Separation (review) Sov. J. Quant. Electron, vol. 6, No. 2, Feb. 1976 129–150.
V.S. detokhov, Laser Isotope Separation (review), II Sov. J. Quant. Electron, vol. 1. 6, No. 3, Mar. 1976–259–276.
D.R. Meacher, "Observation of the Collapse . . . " J. Phys. B: At. Mol. Opt. Phys. 24 (1991) 266–269.
R.D. McAlpine et al. "Laser Isotope Separation . . . " Advances in Chemical Physics v. Lx (60) pp. 31–99.
J. Wals et al. "Observation of Rydberg Wave . . . " Physical Review Letters, vol. 72, No. 24, 13 Jun. 1994, 3783–3786.
A. ten Wolde et al. "Observation of Radially . . . " Physical Review Letters, vol. 61, No. 18, 31 Oct. 1988, 2099–2101.
J.A. Yeazell et al. "Classical Periodic Motion . . . " Physical Review A. vol. 40, No. 9, Nov. 1, 1989 5040–5043.
J.A. Yeazell et al. "Observation of the Collapse . . . , " Physical Review Letters, vol. 64, No. 17, 23 Apr. 1990 2007–2010.
J.A. Yeazell et al. "Observation of Fractional . . . " Physical Review A. vol. 43, No. 9, May 1, 1991 5153–5156.

*Primary Examiner*—Ngoclan Mai
*Attorney, Agent, or Firm*—Ladas & Parry

[57] ABSTRACT

A method for the separation of one isotope from other isotopes in a gaseous mixture of isotopes. First the gaseous mixture of isotopes is non-selectively excited by a laser pulse, so as to form spatially localized wavepackets in the isotopes, which initially oscillate in phase with each other. After a certain time interval has passed, during which the wavepackets have undergone substantial revival, the oscillations of the wavepacket in the isotope to be separated are substantially out of phase with respect to the oscillations of the wavepackets in the other isotopes. Following a predetermined time interval the isotope to be separated is selectively excited by another laser pulse and thereafter extracted from the gaseous mixture.

21 Claims, 18 Drawing Sheets

LASER ISOTOPE SEPARATION BY EXCITATION OF WAVEPACKETS

FIELD OF THE INVENTION

This invention relates to a method for the separation of an isotope from a gaseous mixture of isotopes using pulsed lasers.

PRIOR ART

The following is a list of references which are believed to be pertinent as prior art to the present invention:

Abrashkevich, D. G., Averbukh, I. and Shapiro, M., (1994). "Optimal squeezing of vibrational wavepackets in Sodium dimers," *J. Chem. Phys.* 101, 9295–9302.

Averbukh, I. Sh. and Perelman, N. F., (1989). "Fractional revivals: universality in the long-term evolution of quantum wave packets beyond the correspondence principle dynamics", *Phys. Lett.* A139, 449–453.

Averbukh I. and Shapiro, M., (1993) "Optimal squeezing of molecular wavepackets", *Phys. Rev.* A47, 5086–5092.

Baumert, T., Engel, V., Rottgermann, C., Strunz, W. T. and Gerber G. (1992). "Femtosecond pump-probe study of spreading and recurrence of a vibrational wavepacket in $Na_2$", *Chem. Phys. Lett.* 191, 639–644.

Bowman, R. M., Dantus, M. and Zewail, A. H. (1989). "Femtosecond transition-state spectroscopy of iodine: from strongly bound to repulsive surface dynamics", *Chem. Phys. Lett.* 161, 297–302.

Condon, E. V. and Shortley, G. H. (1957). "The theory of atomic spectra", Cambridge, at the University Press, p. 113.

Greenland, P. T. (1990). "Laser isotope separation", *Contemporary Physics*, 31, 405–424.

Gruebele, M., Robert, G., Dantus, M., Bowman, R. M. and Zewail, A. H. (1990). "Femtosecond temporal spectroscopy and direct inversion to the potential: application to iodine", *Chem. Phys. Lett.* 166, 459–469.

Letokhov, V. S. (1977). "Laser separation of isotopes", *An. Rev. Phys. Chem.*, 28, 133–159.

Letokhov, V. S. and G. B. Moore (1976a). "Laser isotope separation (review)", *Sov. J. Quant. Electron.* 6, 129–150.

Letokhov, V. S. and G. B. Moore, (1976b). "Laser isotope separation (review) II", *Sov. J. Quant. Electron.* 6, 259–276.

Meacher, D. R., Meyler, P. E., Hughes, I. G. and Ewart, P. (1991). "Observation of the collapse and fractional revival of a Rydberg wavepacket in atomic Rubidium", *J. Phys.* B24, L63–L69.

McAlpine, R. D. and Evans, D. K. (1985). "Laser isotope separation by the selective multiphoton decomposition process", in Photodissociation and Photoionization, (Advances in Chemical Physics, v. 60), Wiley, 31–98.

Wals, J., Fielding, H. Christian, J., Snoek, L., van der Zande W. and van Linden van den Heuvell, H. B. (1994). "Observation of Rydberg wavepacket dynamics in a Coulombic and magnetic field", *Phys. Rev. Lett.* 3783–3786.

Wolde, A. ten, Noordam, L. D., Lagendijk A. and van Linden van den Heuvell, H. B. (1988). "Observation of radially localized atomic electron wavepacket", *Phys. Rev. Lett.* 61, 2099–2101.

Yeazell, J. A., Mallalieu, M., Parker J. and Stroud, C. R. (1989). "Classical periodic motion of atomic-electron wavepackets", *Phys. Rev.* A40, 5040–5043.

Yeazell, J. A., Mallalieu M. and Stroud, C. R. (1990) "Observation of the collapse and revival of a Rydberg electronic wavepacket", *Phys. Rev. Lett.* 64, 2007–2010.

Yeazell, J. A. and Stroud, C. R. (1991). "Observation of fractional revivals in the evolution of a Rydberg wavepacket", *Phys. Rev.* A43, 5153–5156.

U.S. Pat. No. 3,443,087.

U.S. Pat. No. 3,772,519.

The above references will be referred to herein by indicating, within brackets the name of the author and the year of publication.

BACKGROUND OF THE INVENTION

The use of lasers for the separation of isotopes is well documented in the literature (see for example Letokhov and Moore, 1976) and a number of isotopic separation processes have been patented (e.g., U.S. Pat. No. 3,443,087; U.S. Pat. No. 3,772,519). Laser isotope separation methods naturally fall into two categories, one based on the "*molecular approach*" and the other based on the "*atomic approach*". Whichever of the two approaches is used, the basic underlying principle is the same and is based on the fact that there exists a very slight difference in the quantum energy levels of different isotopes of a given element or one of its compounds (the so-called "*isotopic shift*").

Despite the very small value of the isotopic shift, current sources of highly stabilized tunable continuous wave (cw) laser radiation allow, in principle, the excitation of one isotopic component in a gaseous mixture of isotopes while leaving the other one unexcited, by an appropriate choice of laser wavelength (Greenland, P. T., (1990); Letokhov, V. S., (1977); Letokhov, V. S., and Moore, G. B. (1976a); Letokhov, V. S., and Moore, G. B. (1976b); McAlpine, R. D. and Evans, D. K. (1985)). The isotopic component in the excited state can then be separated off from those in the ground state by various known per se methods (Greenland, P. T., (1990); Letokhov, V. S., (1977); Letokhov, V. S., and Moore, G. B. (1976a); Letokhov, V. S., and Moore, G. B. (1976b); McAlpine, R. D. and Evans, D. K. (1985)). For example, the excited component may be ionized by the application of an additional laser and then extracted by electromagnetic methods. Other methods of extraction rely on specific chemical properties of the excited isotopic components as contrasted to the unexcited ones.

The advantage of laser isotope separation methods is that very high enrichment is attainable in a single step, as opposed to multiple cascading as required in, say, the gas diffusion technique (Greenland, P. T. (1990)). However, known isotope separation methods require powerful laser sources with precisely controlled wavelengths tuned for the excitation of individual stationary or quasistationary states in the atoms or molecules of the isotope to be separated.

There are two basic drawbacks with prior art laser isotope separation methods, one being that the laser has to be tunable to a very precise degree since the difference in the energy levels between isotopes of a given element or compound are extremely small, and the other is that these laser sources are very expensive. Pulsed lasers, on the other hand, are much cheaper but they cannot be used by prior art laser isotope separation techniques since their mode of interaction with atoms and molecules is completely different than that of cw lasers. By exciting atoms or molecules by a very short pulse having a broad spectral band width, a linear superposition (i.e. a packet) of a large number of quantum states of different energies is created, rather than only a single stationary state as in the CW laser methods described above. The created coherent superpositions of the excited stationary states form a localized wavepacket having a particle-like nature with dynamics obeying quasiclassical laws. The possibility of using pulsed lasers for creating localized wavepackets in atoms or molecules has been known for some time, however, there has been no attempt to utilize the properties of these wavepackets to propose a method for the separation of isotopes.

It is the object of the present invention to replace the precise and expensive laser sources used in prior art laser isotope separation methods by more common pulsed laser sources so as to induce wavepackets in the isotopes and to exploit the properties of the wavepackets to achieve separation of the isotopes.

BRIEF DESCRIPTION OF THE DRAWINGS

For better understanding, the invention will now be described by way of example only, with reference to the accompanying drawings in which.

SUMMARY OF THE INVENTION

Figure 1:
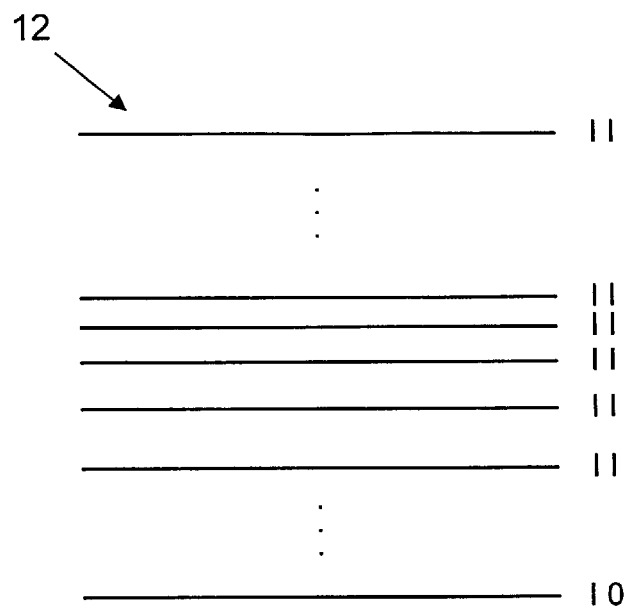
FIG. 1 shows the discrete energy levels of a quantum system.

In accordance with the present invention there is provided a method for the separation of one isotope from the other isotopes in a gaseous mixture of isotopes comprising the steps of:

non-selectively exciting said gaseous mixture of isotopes by a first laser pulse of a first center frequency and a first duration to form spatially localized wavepackets in said isotopes which initially oscillate in phase with each other;

waiting a predetermined time interval until the oscillations of the wavepacket in said one isotope are substantially out of phase with respect to the oscillations of the wavepackets in said other isotopes and the wavepackets have undergone substantial revival;

selectively exciting, after said predetermined time interval, said one isotope by a second laser pulse of a second center frequency and a second duration; and extracting said selectively excited one isotope by an appropriate extracting technique.

Typically, said first center frequency is chosen to be resonant to a group of excited quantum states in said isotopes, whereby the desired spatially localized wavepackets are formed in said isotopes.

Invariably, the durations of said first and second laser pulses are much shorter than the periods of oscillation of said wavepackets.

Generally, the predetermined time interval between non selectively exciting spatially localized wavepackets in said isotopes by a first laser pulse and selectively exciting said one isotope by a second laser pulse pursuant to revival of the wavepackets, is determined by the following sequence of operations:

(i) determining the time interval required for the formation of a substantial phase difference to be established between the oscillations of the wavepacket in said one isotope and the oscillations of the wavepackets in said other isotopes;

(ii) determining the revival time for the wavepacket in said one isotope;

(iii) finding the location of the time span where both the revival of the wavepackets in said isotopes and said substantial phase difference between the oscillations of said wavepackets occur essentially simultaneously;

(iv) adjusting the center frequency of said second laser pulse to ensure that the absorption of said second laser pulse occurs substantially near one of the classical turning points of the oscillating wavepacket in said one isotope; and (v) determining, in said time span, the time at which the probability of excitation of said wave packet in said one isotope by means of said second laser pulse is essentially maximum.

In order to ensure that said time interval between the first and second laser pulses has been determined to the extent that the second laser pulse will preferentially excite said first isotope without substantially exciting said other isotopes, the above sequence of operations should preferably be augmented by the following steps:

a.1 determining a first signal indicative of the concentration of said extracted one isotope and a second signal indicative of the concentration of said other isotopes as a function of said predetermined time interval;

a.2 adjusting the center frequency of said first laser pulse to achieve a minimum of overlap between the peaks of said first signal and the peaks of said second signal; and a.3 choosing the time at which said second laser pulse is to be emitted as being precisely that time at which a peak in said first signal occurs.

Preferably, said peak in said first signal at which said second laser pulse is to be emitted falls essentially between peaks in said second signal thereby maximizing the selectivity of the separation process.

By way of a specific example of the present invention said gaseous mixture of isotopes comprises two isotopes, a first and a second isotope, and the angular frequency of the oscillations, $\omega_1$, of the wavepacket in the first isotope is different in magnitude from the angular frequency of the oscillations, $\omega_2$, of the wavepacket in the second isotope by a quantity $\Delta\omega = |\omega_1 - \omega_2|$. The angular frequencies of oscillation, $\omega_1$, $\omega_1$ depend on the center frequency of the first laser pulse, and therefore on the central energy E of the respective wavepackets.

Preferably, the predetermined time interval $\Delta\tau$, for the oscillations of the wavepackets in the first and second isotopes to be substantially out of phase with each other, while at the same time the wavepackets have undergone substantial revival, and the corresponding energy E, are determined by the following sequence of operations:

(i) obtaining a value for the time interval $\Delta t_s(E)$, required for a substantial phase difference to be formed between the oscillations of the wavepackets in the two isotopes from the equation $$\Delta t_s = \frac{\pi}{\Delta\omega(E)} ;$$

(ii) determining the revival time, $T_{rev}(E)$, for the wavepacket in said first isotope from the equation:

$$T_{rev}(E) = \frac{4\pi}{\hbar\omega_1} \left| \frac{d\omega_1(E)}{dE} \right|^{-1},$$

where $\hbar$ is Planck's constant divided by $2\pi$;

(iii) determining the central energy E of the wavepacket in the said first isotope from the equation $$m \frac{T_{rev}(E)}{2} = (2l - 1)\Delta t_s(E),$$

where m and l are integers;

(iv) estimating, from the expression $\Delta\tau \approx (2l-1)\Delta t_s(E)$ the location of that time span where both the revival of the wavepackets of said two isotopes and a substantial phase difference between the oscillations of said wavepackets occur essentially simultaneously.

Preferably, those solutions of the equation $$m \frac{T_{rev}(E)}{2} = (2l - 1)\Delta t_s(E)$$

are used which correspond to quantum levels with a high probability of optical excitation, and the smallest values of the integers m and l are utilized.

If desired the derivative $$\frac{d\omega_1(E)}{dE}$$

can be determined from the dependance of $\omega_1(E)$ for a wavepacket considered as a classical particle with energy $E=E_n$.

Further if desired, the derivative can be obtained from the following approximation:

$$\frac{d\omega_1(E)}{dE} \approx \frac{\omega_{n+1,n} - \omega_{n,n-1}}{E_{n+1} - E_n},$$

where $\omega_{n+1,n} = (E_{n+1} - E_n)/h$ is the frequency spacing between adjacent excited quantum levels in the first isotope.

By one application said first laser pulse excites said wavepackets in a single photon process. By another application said first laser pulse excites said wavepackets in a multiphoton process. By yet another application said second laser pulse excites said wavepackets in a multiphoton process.

DETAILED DESCRIPTION OF PREFERRED EMBODIMENTS OF THE INVENTION

The basic mechanism involved in the application of the method of the invention is the creation of localized wavepackets in isotopes of the same element or compounds of different isotope composition and the exploitation of the phase differences that develop between the spatial oscillations of the wavepackets in the different isotopes as time evolves. This basic mechanism is identical for both atomic and molecular isotopes and hence will be described in a uniform manner. Having set down the basic mechanism, the application of the method of the invention will be described in greater detail for both atomic and molecular isotopes with respect to preferred embodiments.

In the following description, reference will be made to a "*quantum system*", which can be either atomic or molecular in nature, and to its discrete energy levels, which in the case of atomic isotopes can be Rydberg states and in the case of molecular isotopes can be either vibrational states or rotational states of the molecule.

Attention is first drawn to FIG. 1 showing the ground state energy level 10 and a set of discrete excited energy levels 11 of a quantum system 12. A transition of the system from the ground state to one of the excited states is attained by the absorption of a quantum of energy by the system. If $E_n$ denotes the energy of the nth excited level and $E_o$ the ground level, then for a transition from the ground state to the nth state a quantum of energy equal to $E_n$–$E_o$ has to be absorbed by the system 12. In prior art laser isotope separation methods, a tunable continuous wave laser was employed to provide electromagnetic quanta, with an energy precisely equal to a required transition of the quantum system from one state (energy level) to another.

Figure 2:
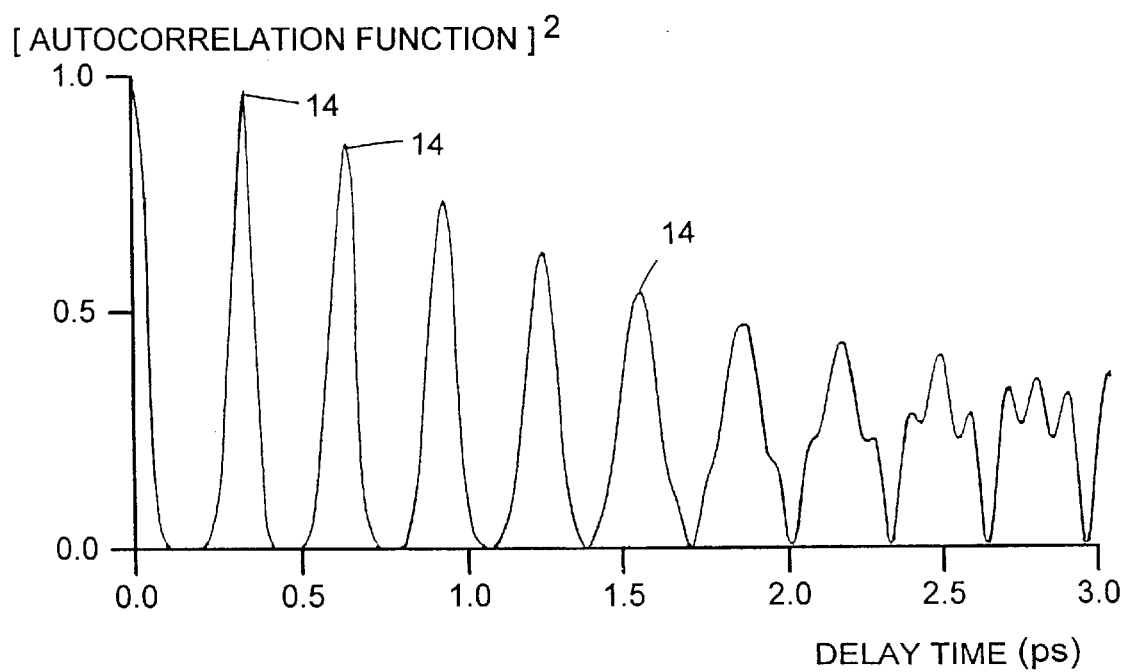
FIG. 2 illustrates the decaying and widening of the peaks of the square of the autocorrelation function of a wavepacket.

In the present invention the quantum system is irradiated by a pulsed laser. The pulses are chosen to be very short in duration, corresponding to a wide spectral bandwidth (at least several times the spectral distance between adjacent discrete energy levels (say the nth and the (n+1)th) of the system. As a consequence of the absorption of the pulse by the quantum system, a linear superposition of a number of quantum states with different energies is created. This linear superposition of the states forms a wavepacket in the quantum system. That is, instead of exciting a discrete transition from one energy state to another, a short incident pulse excites a wavepacket in the quantum system. The excited wavepacket undergoes oscillatory motion as the quantum system undergoes spatial expansions and contractions (Gruebele, M., Robert, G., Dantus, M., Bowman, R. M. and Zewail, A. H. (1990)). A convenient way of illustrating this motion of the wavepacket is by plotting the square of the autocorrelation function of the wavepacket, as shown in FIG. 2. As shown, the square of the autocorrelation function is a quasi-periodic function of the delay time, with each peak 14 corresponding to times at which the delayed wavepacket exactly overlaps the original wavepacket and the distance between peaks is simply the period of oscillation of the wavepacket.

The distances between the neighboring energy levels 11 shown in FIG. 1 are not, in general, equal resulting in a dephasing of the contributions of the various states to the wave packet as it evolves in time. As a consequence, the wavepacket loses its shape as time elapses. FIG. 2 shows the resulting autocorrelation function squared, from which it can be seen that the peaks decay and widen as the time delay increases.

Figure 3:
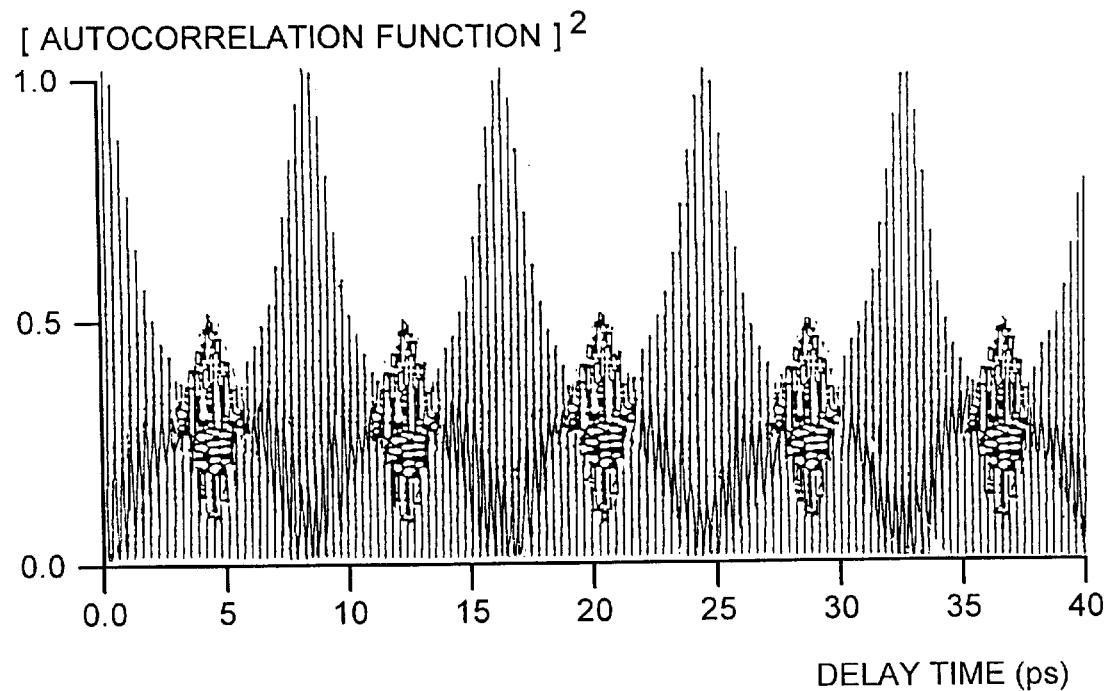
FIG. 3 shows the square of the autocorrelation function of a wavepacket, illustrating its revivals and fractional revivals.

Attention is now drawn to FIG. 3, showing the behavior of the autocorrelation function of the wavepacket over a time period thirteen times longer than that shown in FIG. 2. As can be seen, the wavepacket constantly reconstitutes its initial shape at times $$t = \frac{k}{2} T_{rev},$$

where k is an integer. For the case shown in FIG. 3 $T_{rev} \approx 16$ ps (pico seconds). More generally, at times $$t = \frac{p}{q} T_{rev}$$

(where p/q is an irreducible fraction) the initial wavepacket revives in the form of q/2 (for q even), or q (for q odd) localized wavepackets. The latter move along the same trajectory, but are shifted in time from each other by a fractional part of the period of oscillation of the wavepacket. This phenomenon is referred to in the art as fractional revival of the wavepacket (Averbukh, I. Sh. and Pearlman, N. F. (1989); Meacher, D. R., Meyler, P. E. Hughes, I. G. and Ewart, P. (1991); Yeazell, J. A. Mallalieu M., Parker J. and Stroud, C. R. (1989); Yeazell, J. A., Mallalieu M. and Stroud, C. R. (1990); Yeazell, J. A. and Stroud, C. R. (1991)).

Figure 4:
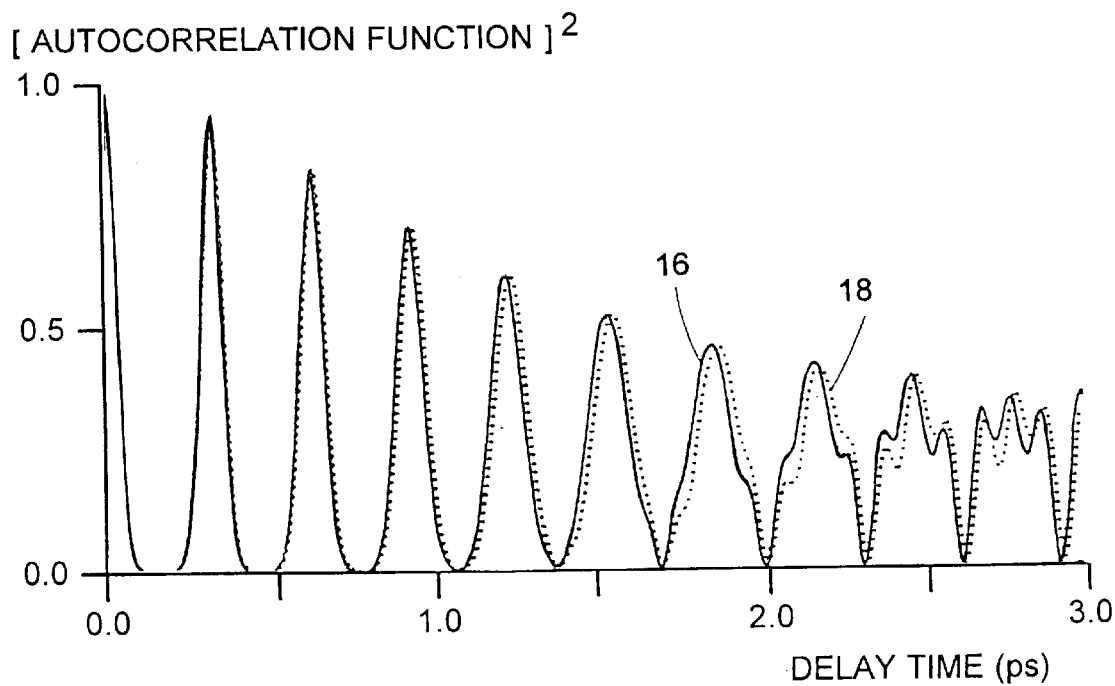
FIG. 4 shows the autocorrelation function of the wavepackets in two molecular isotopes for a time delay between 0 and 3 ps.
Figure 5:
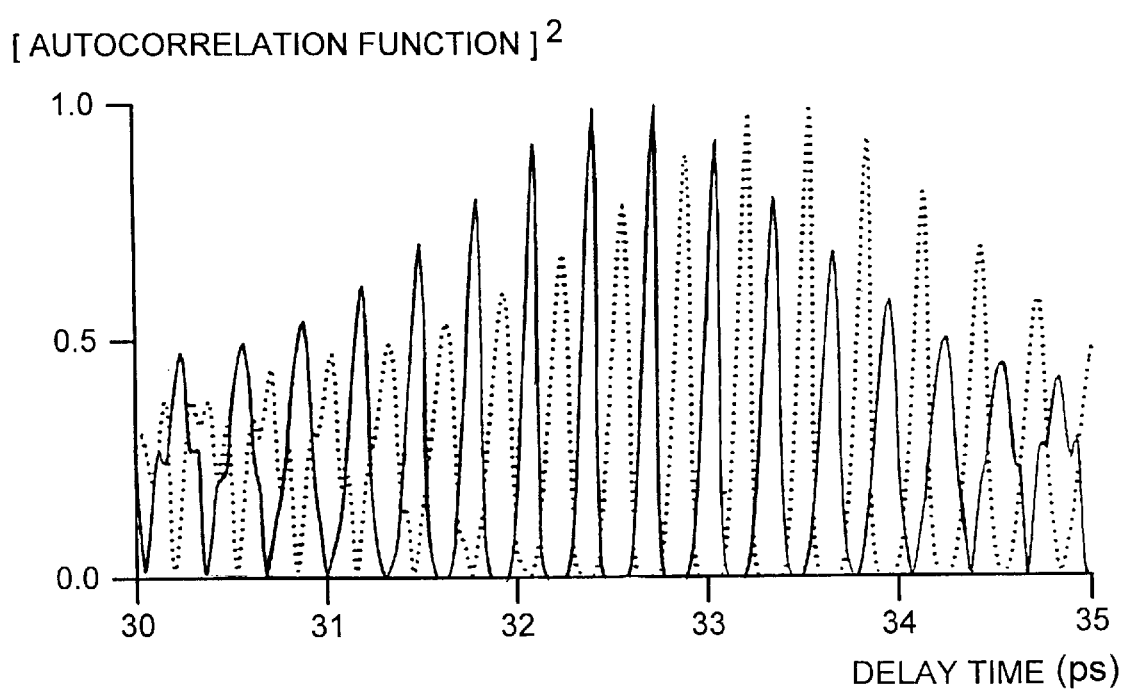
FIG. 5 shows the autocorrelation function of the wavepackets in two molecular isotopes for a time delay between 30 and 35 ps.

Attention is now drawn to FIG. 4 showing the autocorrelation function for the wavepackets in the two isotopes. The computations were made on the molecular isotopes of Bromine, $^{79}Br_2$ (full line 16) and $^8Br_2$ (dotted line 18) for a time delay from 0 to 3 ps. In this specific example the separation of the isotopes entails using the time evolution properties of the wavepackets in order to ionize, to further excite, or bring about dissociation of one of the isotopes so that known extraction techniques can be used to isolate the required isotope. It should be noted that the method is just as well applicable to molecular isotopic compounds. The wavepackets in the two isotopes behave in a similar manner, but the heavier isotope has a slightly longer period of oscillation than that of the lighter isotope. After enough time has elapsed and after several revivals of the wavepackets the oscillations of the two wavepackets become considerably out of phase as is illustrated in FIG. 5, showing the autocorrelation function for the two wavepackets for a time delay between 30 and 35 ps. During this time span the peaks of the autocorrelation function of one isotope fall essentially midway between the peaks of the other. This corresponds to a 180° phase difference between the oscillations of one packet with respect to the other. Put in other words, when one oscillating molecule is completely expanded the other oscillating molecule is completely contracted, and vice versa. It is this specific property of the wavepackets that is utilized in the present invention. The energy difference between molecular electronic states is strongly dependent on the relative displacement of the atomic nuclei. Therefore, if the isotopes are exposed to a second laser pulse at a time when the wavepackets are substantially revived (t=32.5 ps, in FIG. 5) and the $^{79}Br_2$ isotope is substantially contracted and the $^8Br_2$ isotope is substantially expanded, it is possible to excite one of the isotopes to a higher electronic state, without exciting the other. That is, due to the phase difference that has developed between the oscillations of the wavepackets in the two isotopes, a second laser pulse can selectively excite one of the isotopes, say to ionization. As will be described later with respect to an embodiment of the invention as applied to molecular isotopes, it is sufficient to selectively excite one of the molecular isotopes to a repulsive potential, or another bound potential and not necessarily to ionization.

Figure 6:
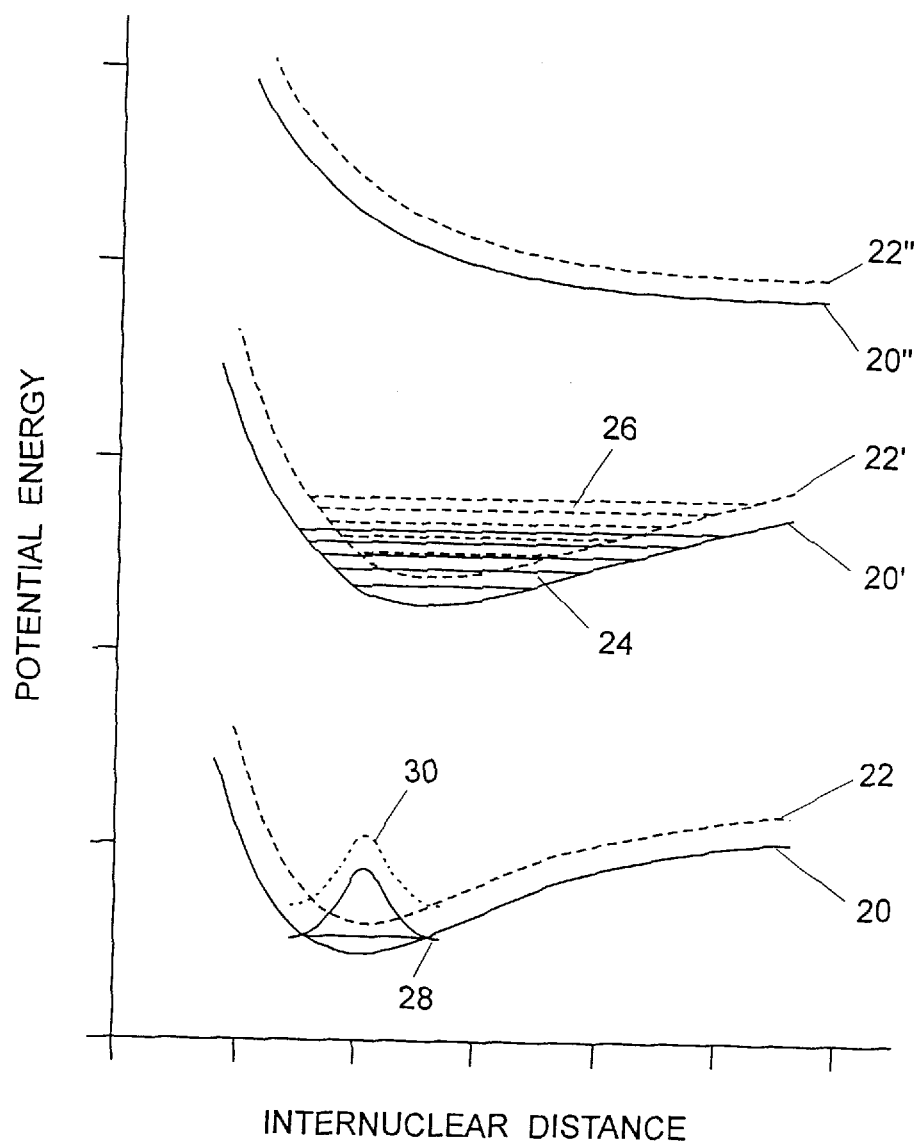
FIG. 6 shows, superimposed on the same plot, typical potential energy states of two diatomic molecular isotopes, their associated vibrational levels and ground state wavefunctions in the two isotopes.
Figure 7:
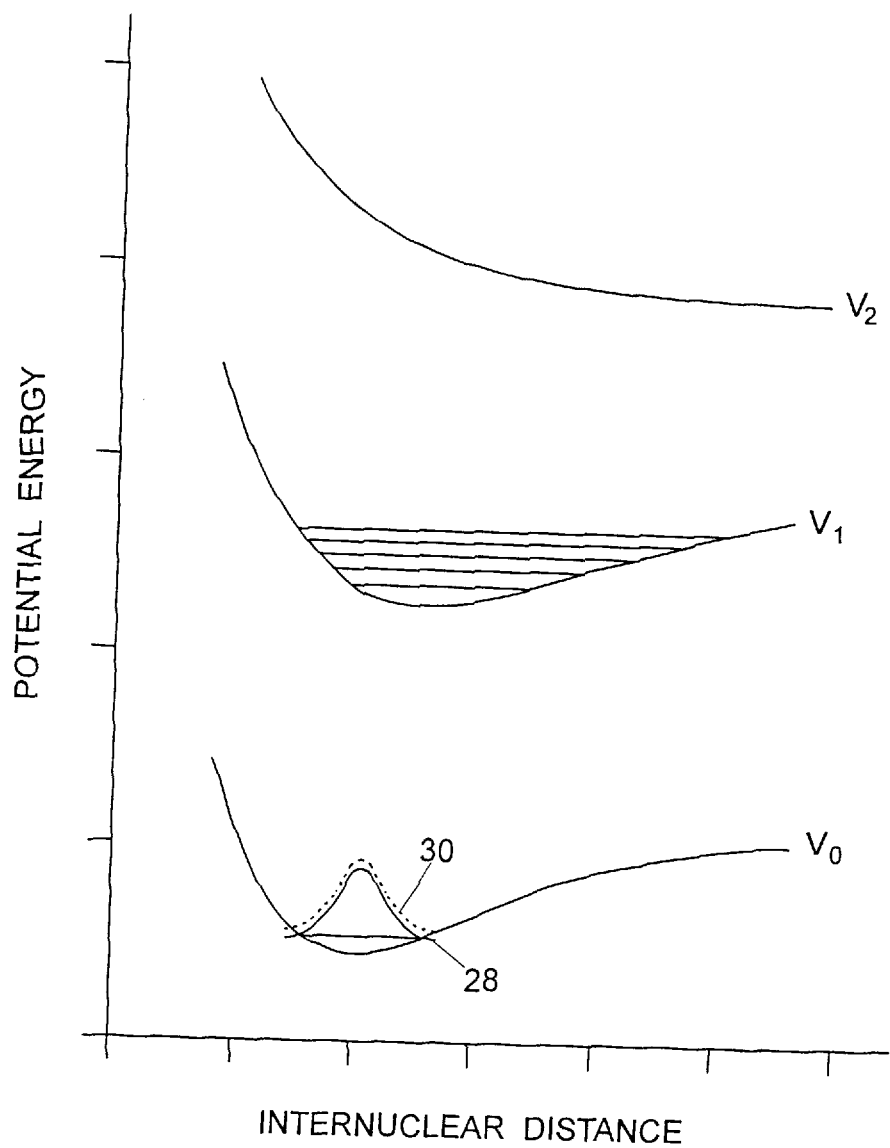
FIG. 7 shows the potential energy states and their associated vibrational levels of the two isotopes of FIG. 6 as being identical, whereas the ground state wavefunctions are shown to be slightly different.

The method of the invention for the separation of isotopes utilizing wavepackets will now be described with reference to molecular isotopes. Attention is drawn to FIG. 6 showing, superimposed on the same plot, typical potential energy states (20,22; 20',22'; 20",22") of two diatomic molecular isotopes (or molecular isotope compounds) and their associated vibrational levels 24, 26, respectively. Also shown are the ground state vibrational functions 28, 30 in the two isotopes. The isotopes will be denoted by A and B for the solid and dashed lines, respectively. It is the very small difference between the potential energy states and the corresponding vibrational levels of the two isotopes that is exploited by prior art methods in order to selectively excite one of the molecular isotopes. In the present invention it is the time evolution properties of the wavepackets that are exploited to achieve separation of the isotopes. It is for this reason, and the fact that the difference between the corresponding potential energy states of the two isotopes is very small that in the following description the potential energy states and the vibrational levels of the two molecular isotopes will be shown to be identical and the three potential energy states (20,20',20" for molecular isotope A and 22,22', 22" for molecular isotope B) will be represented by $V_0$, $V_1$ and $V_2$, respectively, as shown in FIG. 7. The wavepackets 28, 30 are still shown as being slightly different, but this is only for the purpose of keeping track of the two wavepackets and no importance should be attached to the actual distance shown between them in FIG. 8. Furthermore, the form of the wavepackets as shown is only for illustrative purposes and does not purport either to represent their actual shape or their precise location.

Figure 8:
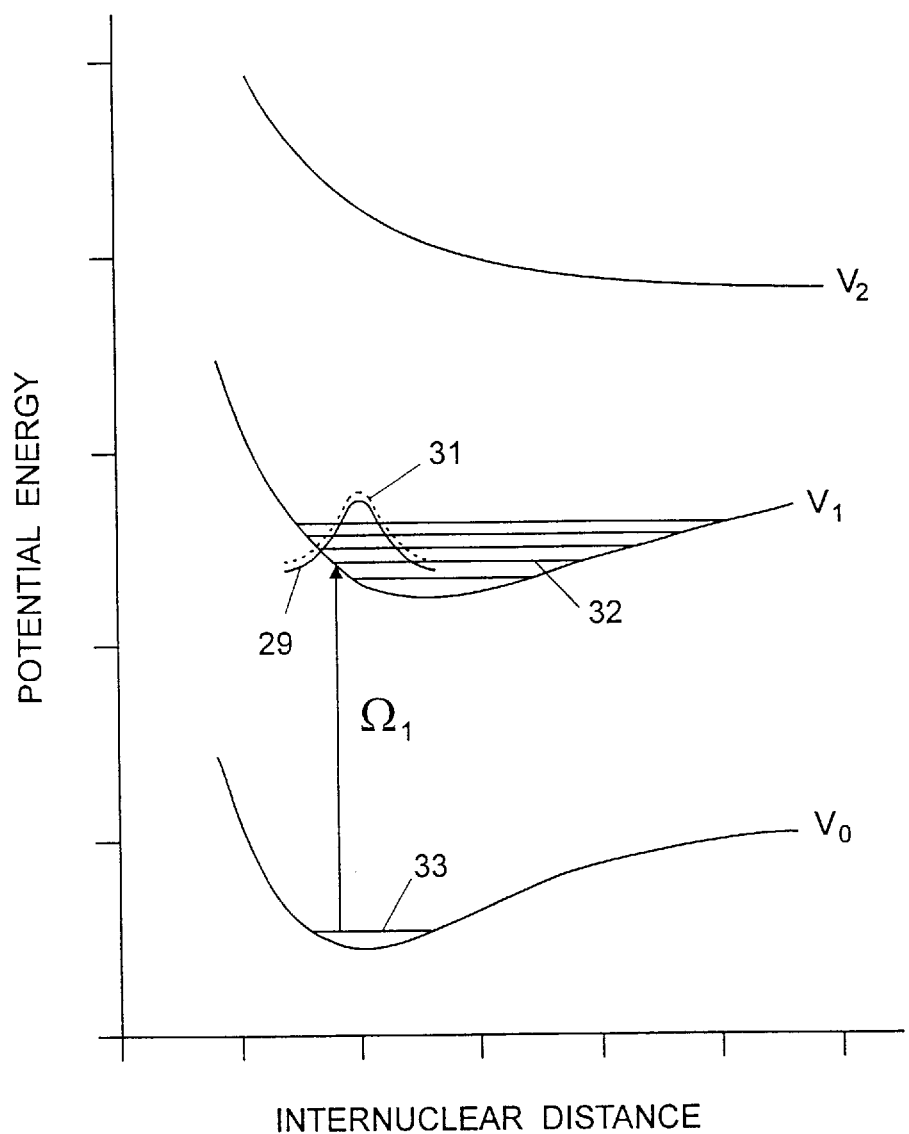
FIG. 8 shows the first stage in a separation process in which vibrational wavepackets are excited in an upper bound potential state of two diatomic molecular isotopes.
Figure 9:
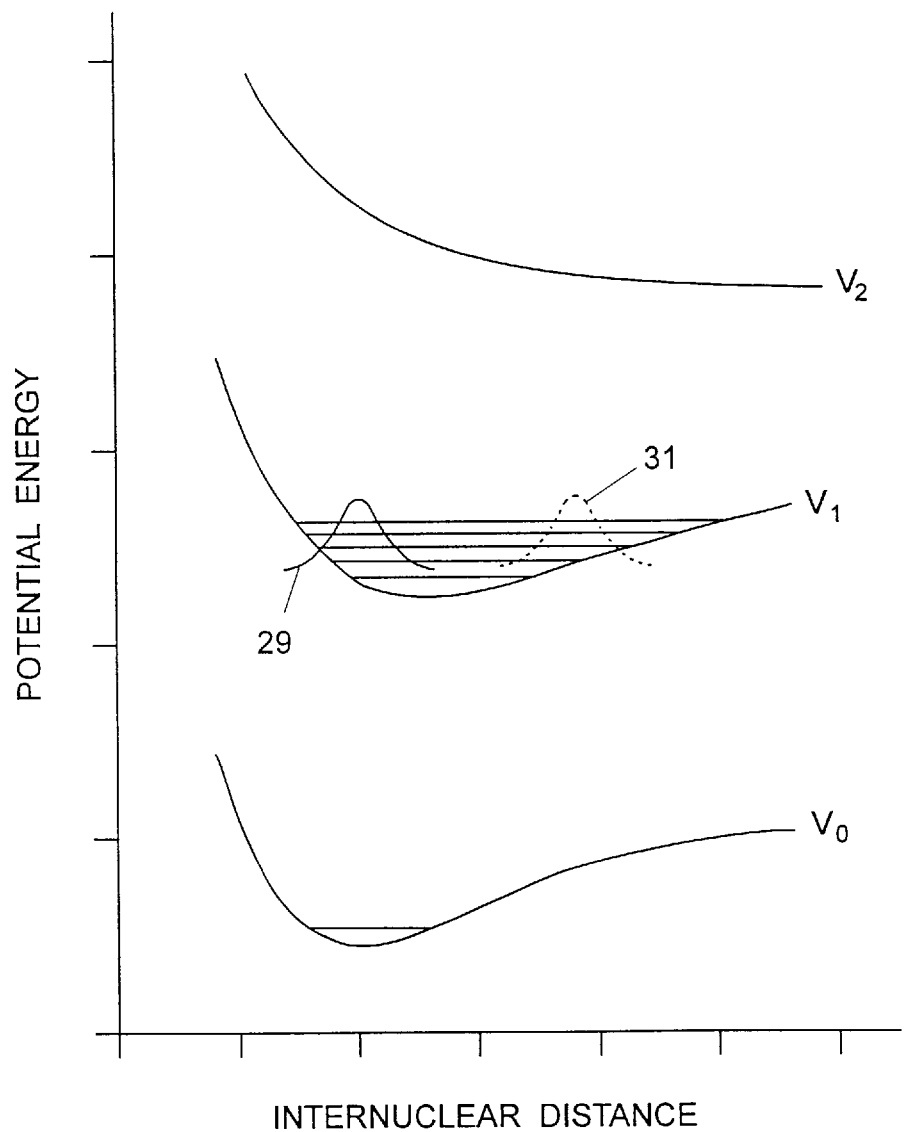
FIG. 9 shows the situation in which the centers of gravity of the wavepackets in the upper bound potential states of two diatomic molecular isotopes are at different internuclear distances.
Figure 10:
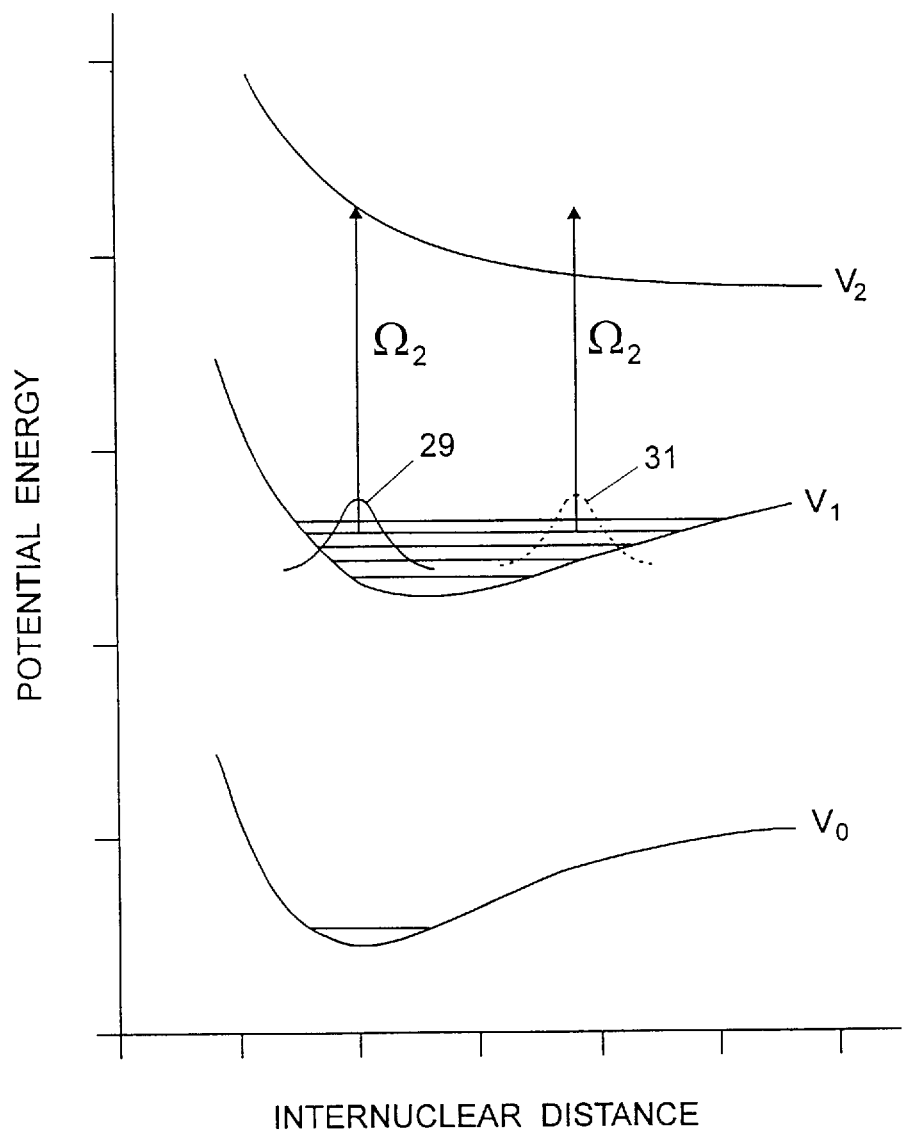
FIG. 10 shows the irradiation of the isotopes, in the configuration shown in FIG. 9, by a laser pulse of center frequency resonant to the electronic transition from the upper bound potential state to the upper repulsive potential state.
Figure 11:
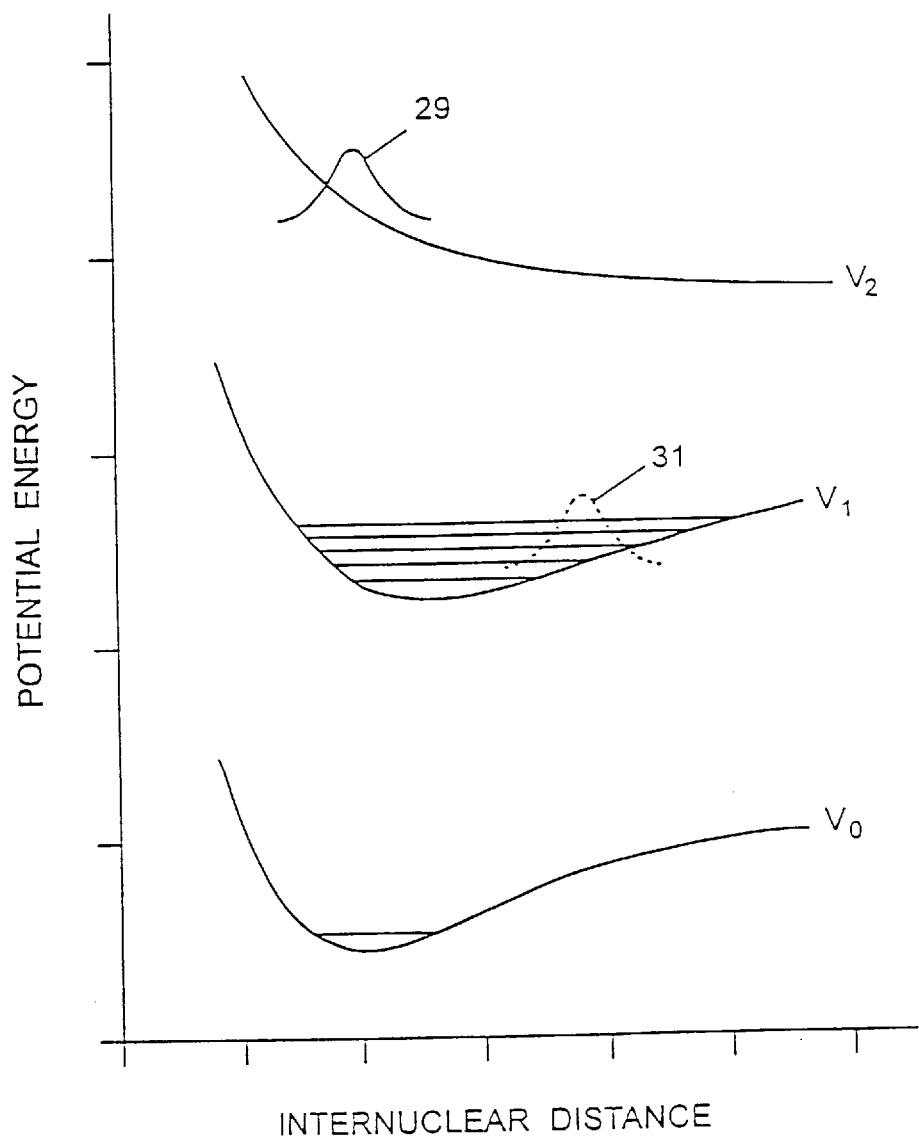
FIG. 11 shows a wavepacket excited in the upper repulsive potential of one isotope of a gaseous mixture of two isotopes with the wavepackets in the other isotope remaining in the upper bound potential.

Attention is now drawn to FIG. 8 showing the first stage of the separation process in which a laser pulse of center angular frequency $\Omega_1$ excites vibrational wavepackets 29, 31 in the upper bound potentials $V_1$ of the molecular isotopes A and B, respectively. The center frequency $\Omega_1$ is chosen such that $\hbar\Omega_1$ ($\hbar$ is Planck's constant divided by $2\pi$) is approximately equal to the energy difference between a group of the vibrational levels 32 in the upper bound potential $V_1$ of the two isotopes and the ground state vibrational level 33 in the ground state potential $V_0$ of the two isotopes. The excited wavepackets 29 and 31 oscillate in the upper bound potential state of their respective isotopes, where the oscillations take the form of expansions and contractions of the isotopes. Initially, the wavepackets oscillate in phase, that is when one isotope is expanded so is the other, but due to the slight differences in mass between the two isotopes, the oscillations become out of phase as time elapses. FIG. 9 shows the situation some time after the excitation of the wavepackets in the upper bound state of their respective molecular isotopes. As shown, the position of the center of gravity of the wavepacket 29 is much closer to the origin than is that of wavepacket 31. If at this instant of time the gaseous mixture of diatomic molecular isotopes is irradiated by a second laser pulse of center frequency $\Omega_2$ such that the pulse is resonant to the electronic transition from $V_1$ to $V_2$ at the position of the wavepacket 29 as shown in FIG. 10, then wavepacket 29 is excited in the upper repulsive potential state $V_2$ as shown in FIG. 11. Wavepacket 31 in the molecular isotope B will not be significantly excited in the upper potential $V_2$ since, as can be seen from FIG. 10, the center frequency $\Omega_2$ of the pulse of the second laser is not resonant to the electronic transition from $V_1$ to $V_2$ at the position of the wavepacket at that instant of time. Now that wavepacket 29 is in the upper repulsive potential energy state $V_2$, the molecular isotope A dissociates and the two isotopes can be separated by known per se methods (Letokhov, V. S., and Moore, G. B. (1976a); Letokhov, V. S., and Moore, G. B. (1976b); McAlpine, R. D. and Evans, D. K. (1985)).

Figure 12:
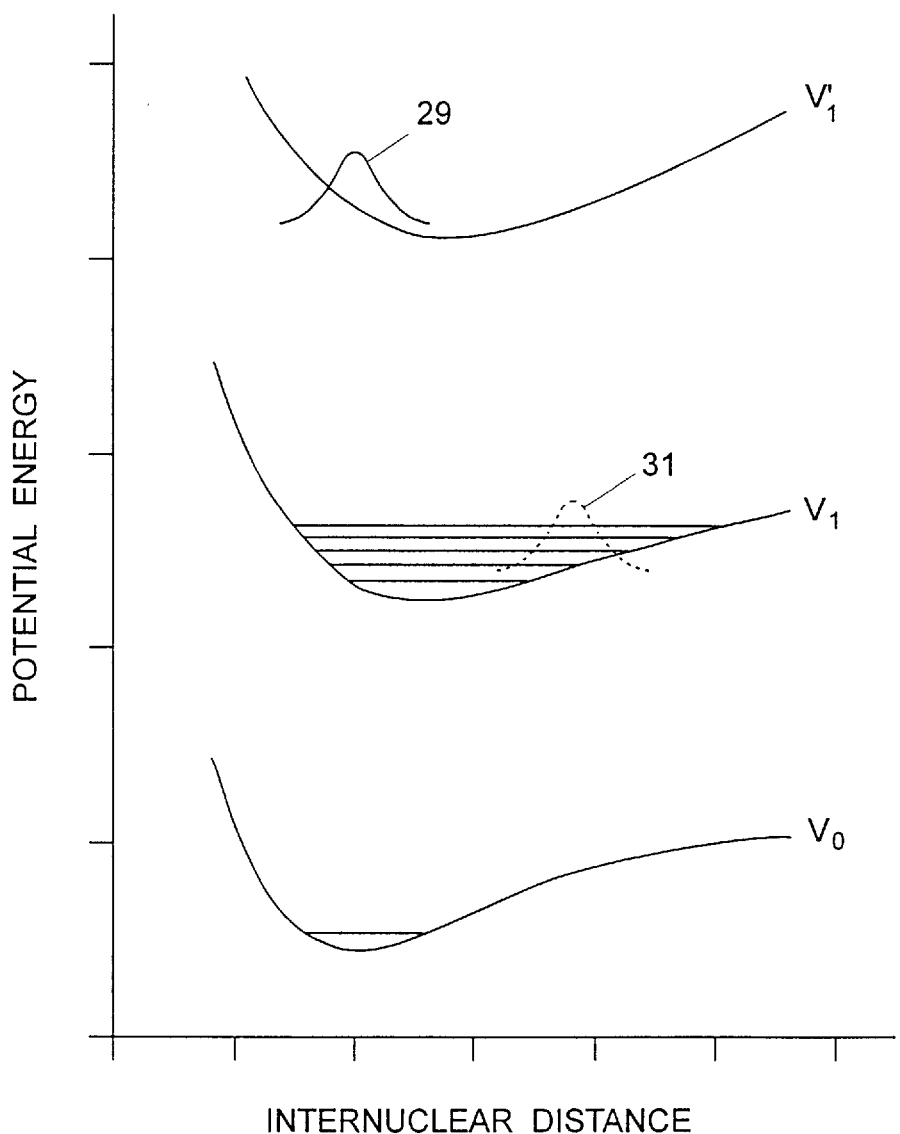
FIG. 12 shows a wavepacket in one isotope of a gaseous mixture of two isotopes excited in one bound electronic state and a wavepacket in the other isotope of the mixture excited in a different bound electronic state.

As a possible variation of the laser isotope separation method illustrated in FIGS. 8 to 11, the center frequency $\Omega_2$ of the second laser pulse can be chosen to be resonant with the electronic transition $V_1$ to $V_1'$ at the position of the wavepacket 29, where $V_1'$ is another bound electronic state, as shown in FIG. 12. With the excited state $V_1'$ populated by the wavepackets 29 in the molecular isotope A, the latter may be extracted from the gaseous mixture by known per se methods (Letokhov, V. S. (1977); Letokhov, V. S., and Moore, G. B. (1976a); Letokhov, V. S., and Moore, G. B. (1976b); McAlpine, R. D. and Evans, D. K. (1985)).

As another possible embodiment of the laser isotope separation method described in FIGS. 8 to 11, the center frequency $\Omega_2$ of the second laser pulse can be chosen to ionize the molecules A by exciting the wavepacket 29 in the ionized molecular state. The ionized molecules may then be extracted by electromagnetic methods (Greenland, P. T. (1990); Letokhov, V. S. (1977); Letokhov, V. S. and G. B. Moore (1976)).

Figure 13:
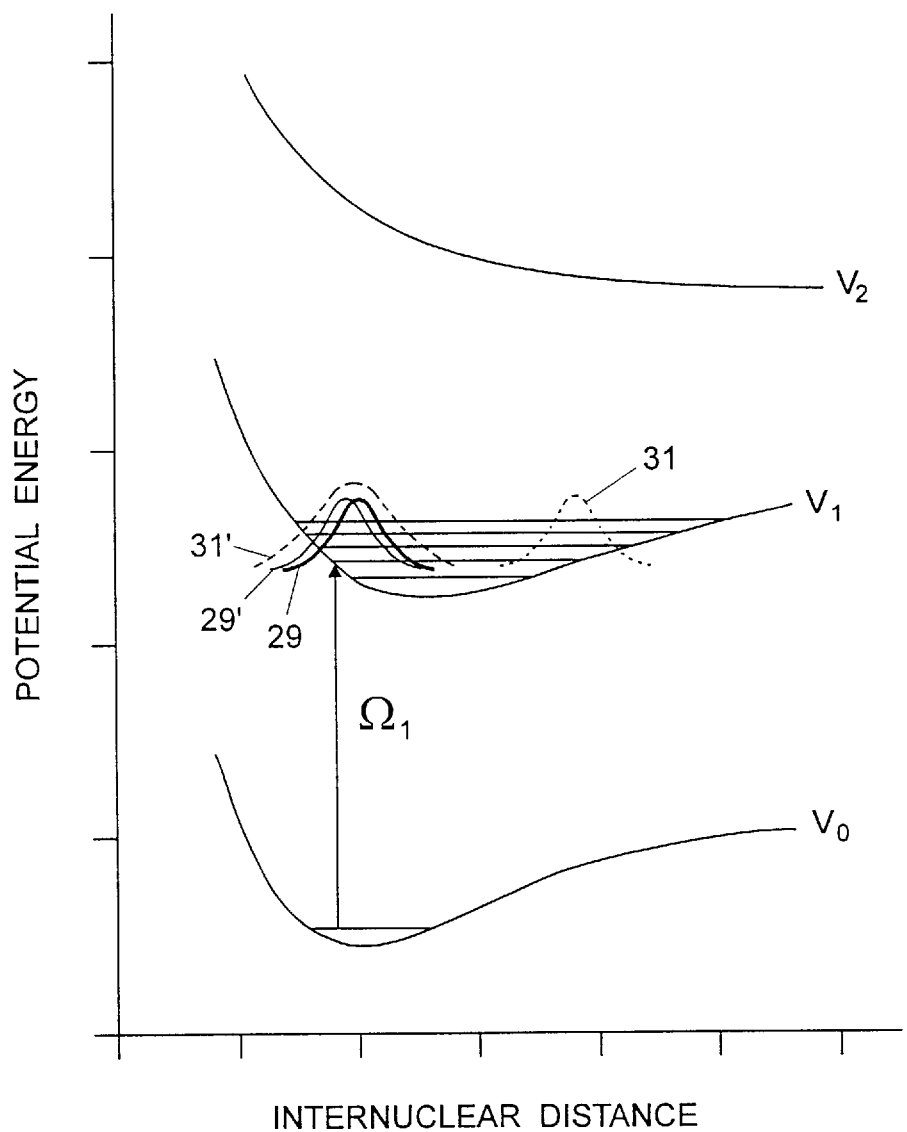
FIG. 13 shows the excitation of wavepackets in a bound electronic state with an overall quantum-mechanical phase different of 180° between the wavepackets.
Figure 14:
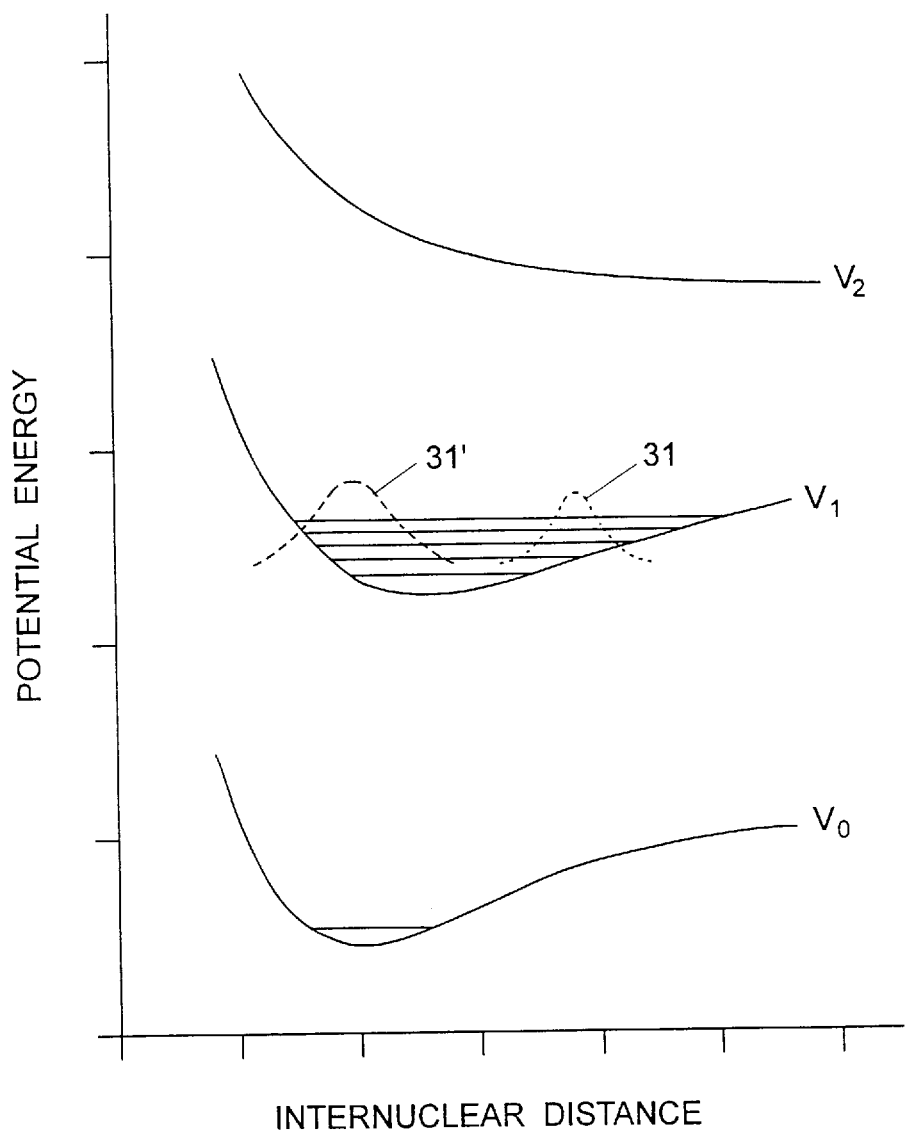
FIG. 14 shows the situation in which the upper bound potential state of one isotope of a gaseous mixture of two isotopes is populated with excited wavepackets whereas the upper bound potential state of the other isotope is not.

Yet another possible embodiment of the method of the invention is illustrated in FIGS. 7 to 9, 13 and 14. In this embodiment, having excited wavepackets 29 and 31 as shown in FIG. 8, starting from the ground state wave functions 28 and 30 shown in FIG. 7, and having waited a certain time until the center of gravities of the wavepackets in the molecular isotopes A and B are at different internuclear distances as shown in FIG. 9, a further laser pulse of the same frequency of the first laser pulse $\Omega_1$ is applied to the gaseous mixture of isotopes so that further wavepackets 29' and 31' are created in the upper bound potential states $V_1$ of the isotopes A and B as shown in FIG. 13. The difference between the wavepackets 29' and 31' as shown in FIG. 13, and the wavepackets 29 and 31 shown in FIG. 8, is that the overall quantum-mechanical phase of the wavepacket 29' is 180° different from that of wavepacket 29. Similarly for wavepackets 31' and 31. This phase difference between the pairs of wavepackets 29, 29' and 30, 30' is obtained by imparting to the second laser pulse of center frequency $\Omega_1$ a 180° phase shift relative to the first laser pulse of center frequency $\Omega_1$. Since wavepackets 29 and 29' are located substantially at the same positions but are 180° out of phase, they interfere destructively and are mutually annihilated. Although the wavepackets 31 and 31' in the molecular isotope B are also 180° out of phase, they are located at different positions in their respective molecules and therefore do not interfere with each other. The result is that the upper bound potential state $V_1$ of the molecular isotope B is by far more populated with excited wavepackets than the upper bound potential energy states $V_1$ of the molecular isotope A, as exemplified in FIG. 14 showing two 180° out of phase wavepackets in the upper bound potential state $V_1$ of the molecular isotope B. As a result of the annihilation of the wavepackets 29 and 29', the energy absorbed by the isotope A from the first pulse of frequency $\Omega_1$ is delivered back to the second pulse of the same frequency. Consequently, the second pulse is amplified while propagating in the gaseous mixture. The introduction of the second laser pulse of center frequency $\Omega_1$ improves the energetics of the separation process, as photons of frequency $\Omega_1$ are expended only for excitation of the desired isotope B. The excited molecular isotopes B can now be extracted from the gaseous mixture by use of chemical methods (Letokhov, V. S. (1977); Letokhov, V. S., and Moore, G. B. (1976a); Letokhov, V. S., and Moore, G. B. (1976b); McAlpine, R. D. and Evans, D. K. (1985)). Another alternative is to apply a second laser pulse or sequence of two pulses in order to excite the wavepackets 31, 31' in a repulsive potential energy state $V_2$ as shown in FIG. 14, whence the excited isotopes B will dissociate and can then be extracted by known methods (Letokhov, V. S. (1977); Letokhov, V. S., and Moore, G. B. (1976a); Letokhov, V. S., and Moore, G. B. (1976b); McAlpine, R. D. and Evans, D. K. (1985)). Yet another alternative would be to apply a second laser pulse of center frequency large enough to cause ionization of the molecular isotope B and then extract it from the gaseous mixture by electromagnetic methods.

It should be noted that in all the embodiments described in the foregoing description, an essential feature is that having excited wavepackets in bound potential energy states in the molecular isotopes A and B, as shown in FIG. 8, one waits a certain time interval until the center of gravities of the wavepackets 29 and 31 shown in FIG. 9 are at different internuclear distances. Preferably, one waits until the difference in the distances from the nuclei is a maximum. This would correspond to times at which the wavepackets in the two different isotopes momentarily stop their oscillatory motion at two opposite classical turning points (i.e., one isotope is fully expanded whereas the other is fully contracted). The closer to this point in time the second laser pulse is applied the more selective is the method. This is clear, for in the opposite situation such as, for example, that shown in FIG. 8 where the two isotopes A and B are both contracted (or in the other extreme if they were both fully expanded) then the second laser pulse could not differentiate between the two wavepackets.

The efficiency of the method of the invention can be improved by decreasing as much as possible the spatial width of the wavepackets. In general, the spatial width of the wavepackets does not remain constant during the periodic motion of the center of gravity of the wavepacket. In the course of its motion, the wavepacket "breathes", i.e. periodically becomes wider and narrower. Wavepackets with a minimal width smaller than the width of the ground state wavepacket are called "squeezed vibrational states" (Abrashkevich, D. G., Averbukh, I. and Shapiro, M. (1994); Averbukh I. and Shapiro, M. (1993)). Whereas the period of oscillation of a wavepacket depends primarily on the center frequency of the exciting pulse, the width of the wavepacket is determined by the spectral composition of the pulse. By correctly tailoring the laser pulses, wavepackets can be produced that are squeezed near the classical turning points during their oscillatory motion (Abrashkevich, D. G. Averbukh, I. and Shapiro, M. (1994); Averbukh I. and Shapiro, M. (1993)). Clearly, the narrower the wavepacket is the more it is localized (i.e. the position of its center of gravity is better defined), leading to a better definition of the difference in distances of the center of gravity of wavepackets excited in different molecular isotopes, hence making the second stage of selectively exciting one of the isotopes more efficient.

Figure 15:
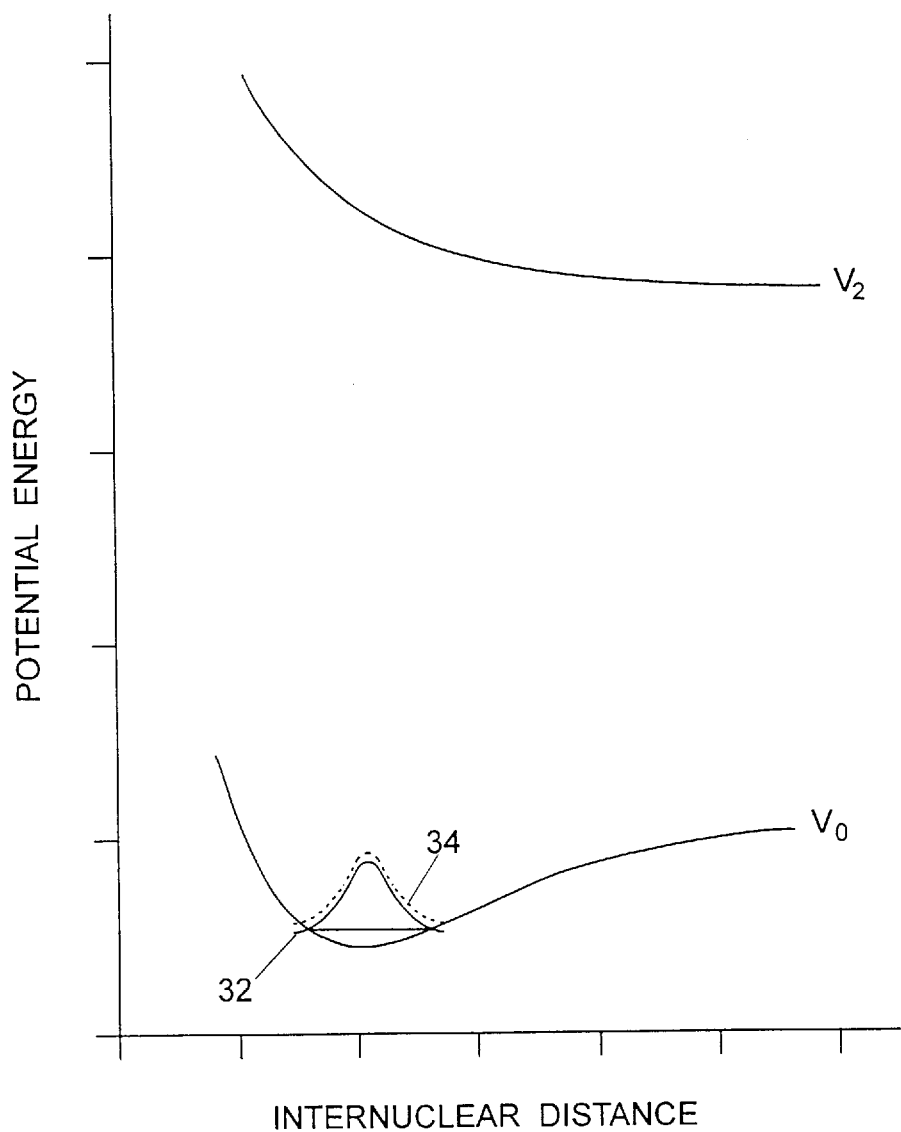
FIG. 15 shows ground state wavepackets of the molecular vibrational states of a gaseous mixture of two molecular isotopes.
Figure 16:
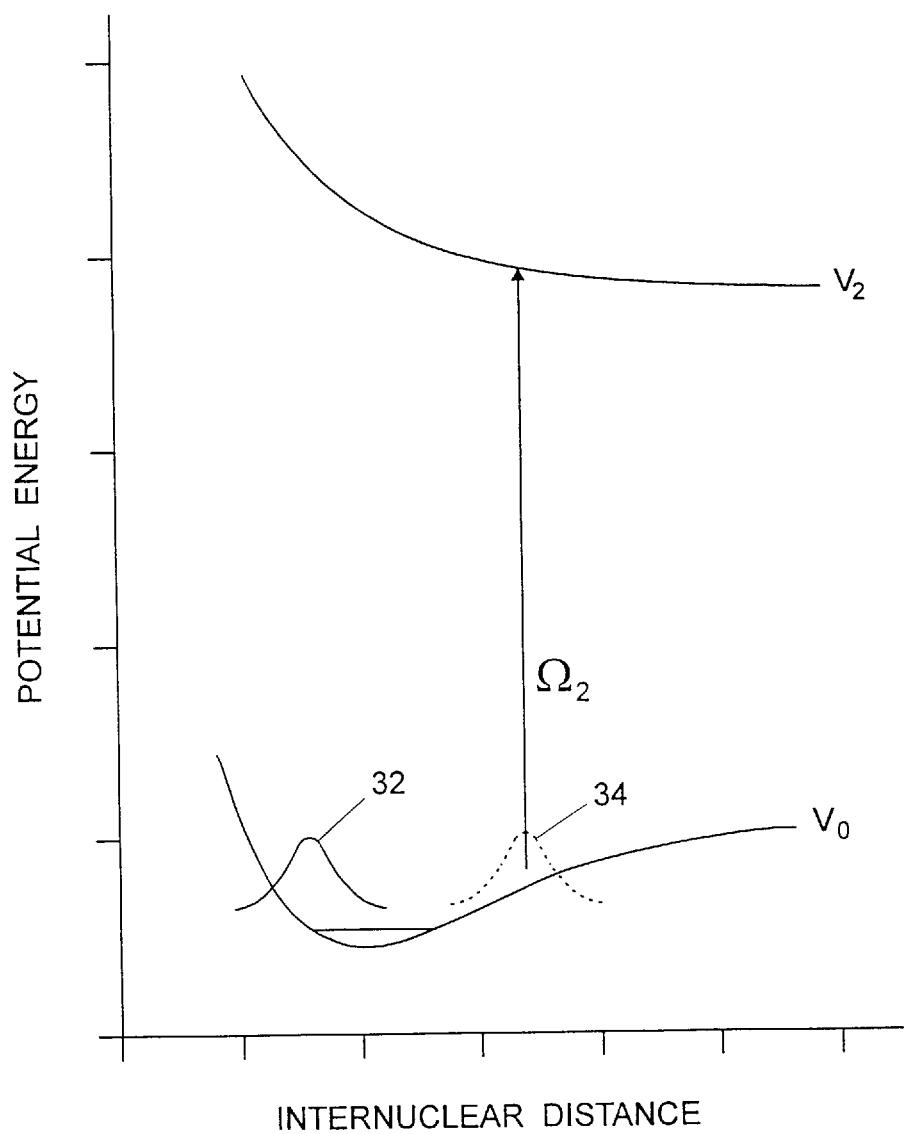
FIG. 16 shows the application of a laser pulse with center frequency resonant to a transition from the ground state to a repulsive state of the molecular isotopes of a mixture of isotopes.
Figure 17:
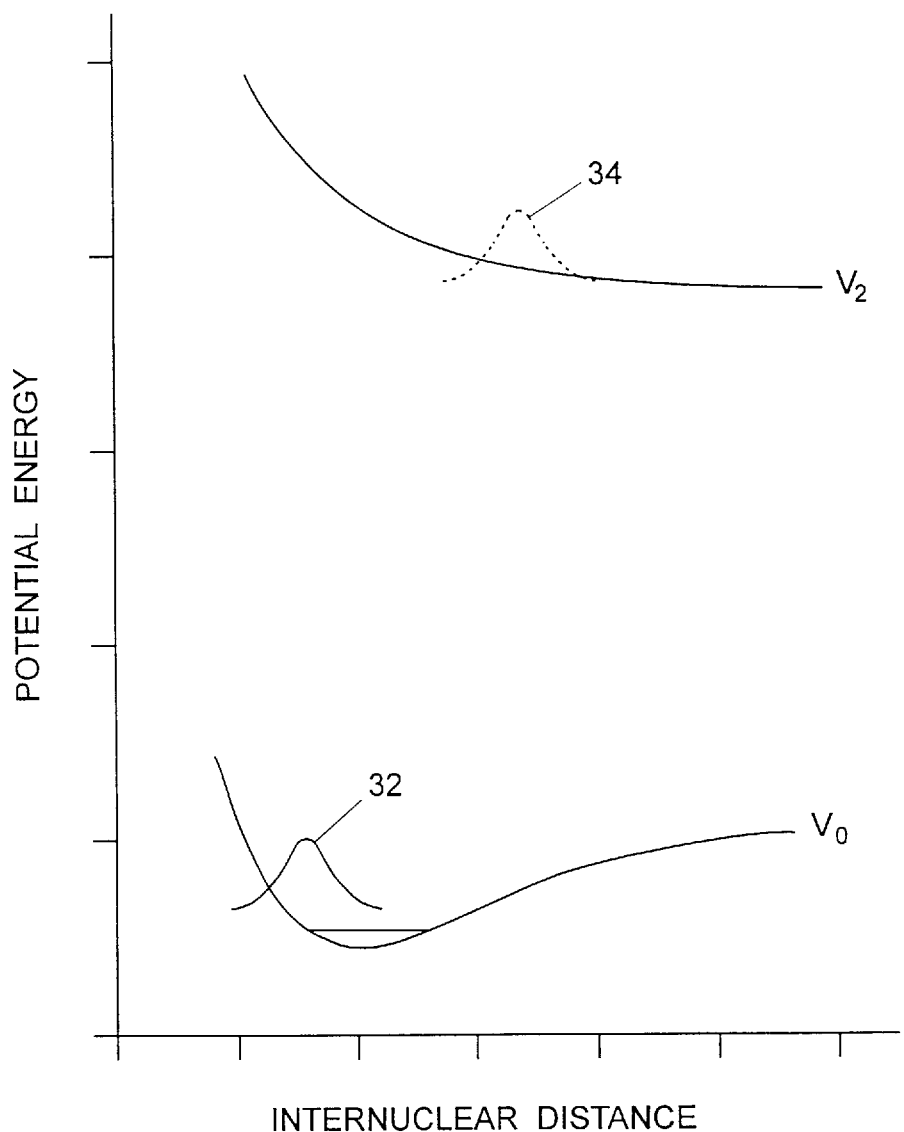
FIG. 17 shows the wavepackets in one isotope of a mixture of two isotopes in the ground state and the wavepacket of the other isotope in a repulsive energy state.

A further embodiment of the method of the invention can be obtained by exciting molecular vibrational wavepackets in the electronic ground state of the isotopes. In FIG. 15, the ground state wavepackets 32, 34 represent unexcited wavepackets of the molecular vibrational states of the two types of molecular isotopes A and B comprising the gaseous mixture. The gaseous mixture is irradiated by a first laser pulse of center frequency in the infrared region, thus exciting the wavepackets to higher molecular vibrational states, whilst remaining in the ground electronic state. In yet another embodiment, the ground state vibrational wavepacket may be excited in a Raman process caused by two optical laser fields of different frequencies. As with the previous embodiments, the excited wavepackets begin to oscillate, initially in phase. After a certain period of time has passed the oscillations of the wavepackets in the two molecular isotopes will be substantially out of phase, and essentially revived, as shown in FIG. 16. If at this instant of time a second laser pulse is applied to the gaseous mixture, having a center frequency $\Omega_2$ resonant to the transition from the ground potential energy state $V_0$ to the repulsive potential energy state $V_2$ at the position of the center of gravity of the wavepacket 34 of isotope B, then the wavepacket 34 will pass to the repulsive potential energy state $V_2$ whilst the wavepacket 32 will remain in the ground state as shown in FIG. 17, whence after it will dissociate and then can be extracted by known methods (Letokhov, V. S. (1977); Letokhov, V. S., and Moore, G. B. (1976a); Letokhov, V. S., and Moore, G. B. (1976b); McAlpine, R. D. and Evans, D. K. (1985)).

Figure 18:
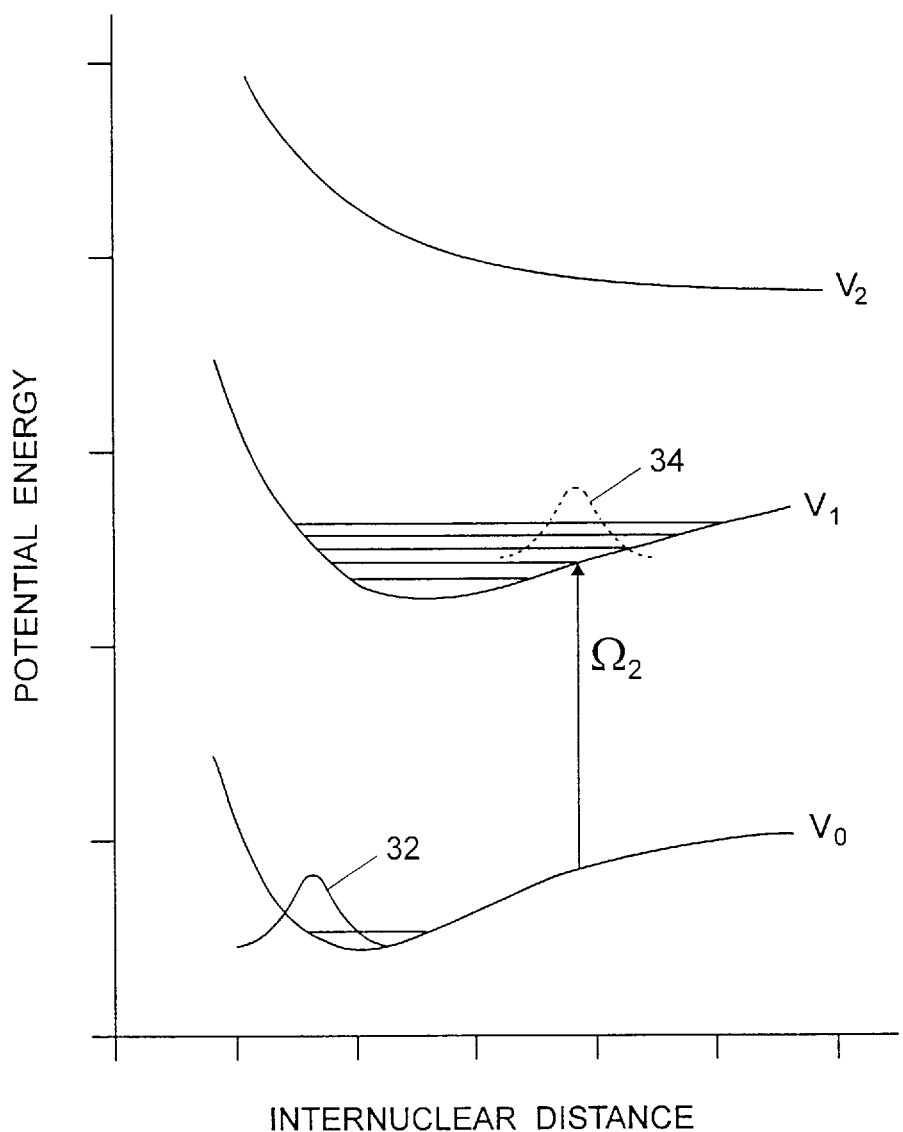
FIG. 18 shows the application of a laser pulse resonant to a transition from the ground state to an upper bound potential state, leaving one wavepacket in the ground state and transferring another to the upper bound potential.

Two further embodiments based on exciting molecular vibrational wavepackets in the electronic ground state of the isotope can be obtained by the choice of two different values of the center frequency $\Omega_2$ of the second laser pulse. The first further embodiment is obtained by choosing $\Omega_2$ to be resonant to the transition from the ground potential energy state $V_o$ to the bound electronic molecule state $V_1$ at the position of the center of gravity of the wavepacket 34 of isotopes B, as shown in FIG. 18. Then the selectively excited isotopes B can then be separated by chemical methods exploiting the difference in chemical properties of the excited isotope B and the unexcited ones A (Letokhov, V. S. (1977); Letokhov, V. S., and Moore, G. B. (1976a); Letokhov, V. S., and Moore, G. B. (1976b); McAlpine, R. D. and Evans, D. K. (1985)). The second further embodiment is obtained by choosing the center frequency $\Omega_2$ to selectively ionize the isotopes B without ionizing the isotopes A. The ionized isotopes B can be extracted by electromagnetic methods (Greenland, P. T. (1990); Letokhov, V. S. (1977); Letokhov, V. S. and G. B. Moore (1976).

The method of the invention for the separation of isotopes utilizing the excitation of wavepackets will now be described with reference to atomic isotopes. A gaseous mixture of two atomic isotopes is irradiated by a first laser pulse of center frequency $\Omega_1$ which excites electronic wavepackets in the atomic isotopes. The wavepackets may be excited either by one photon absorption or by multiphoton absorption or as a result of a cascade process.

Figure 19:
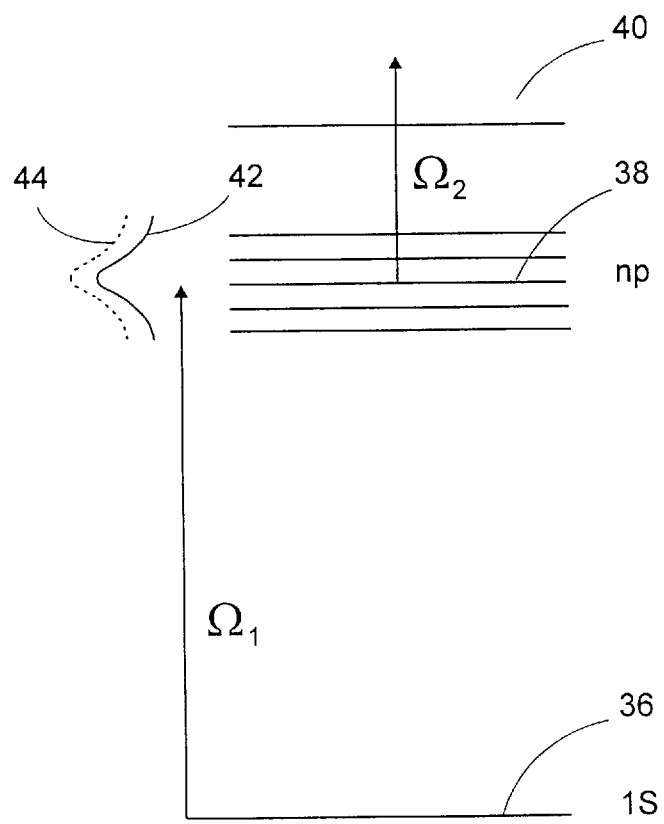
FIG. 19 shows the energy levels of an atom.
Figure 20:
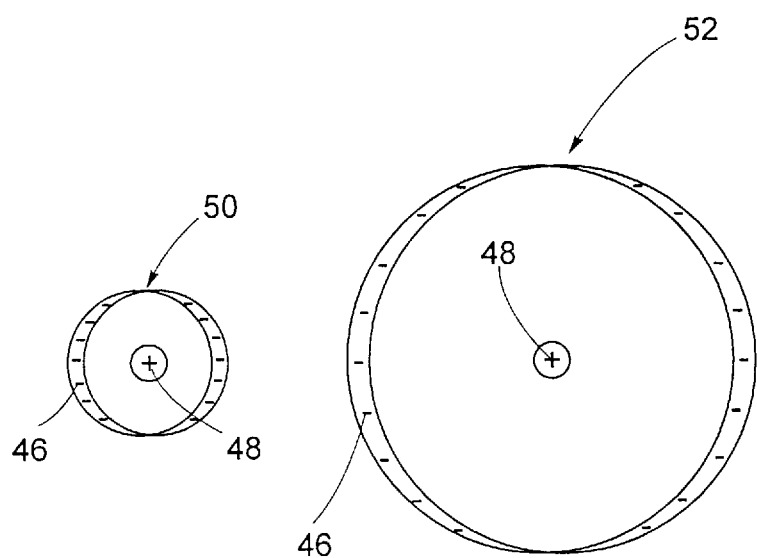
FIG. 20 illustrates schematically the electronic wavepacket excited in an atom.

FIG. 19 shows the energy levels of an atom comprising, in this specific example, a 1s ground state 36, a number of excited np states 38 and the continuum 40 (for the basic definitions of atomic spectra terminology see—Condon, E. V. and Shortley, G. H. (1957)). In the example under consideration the electronic wavepackets are comprised of Rydberg states of the np energy levels of the atoms. The difference between the energy levels of the two atomic isotopes in the gaseous mixture is very small and as with the molecular case, they are shown to be identical. The electronic wavepackets 42 and 44 on the other hand are shown to be slightly different for convenience of illustration. An electronic wavepacket in an atom can be viewed as a cloud of charge in the form of a shell 46 with the nucleus 48 substantially at its center as illustrated schematically in FIG. 20. As the wavepacket oscillates the shell contracts (depicted by 50) and expands (depicted by 52) in the radial direction. The period of oscillation is equal to the Kepler period of a classical particle having the same energy as the mean energy of the excited group of Rydberg states (Wals, J., Fielding, H., Christian, J., Snoek, L., van der Zande W. and van Linden van den Heuvell, H. B. (1994); Wolde, A., ten, Noordam, L. D., Lagendijk A. and van Linden van den Heuvell, H. B. (1988); Yeazell, J. A., Mallalieu, M., Parker, J. and Stroud, C. R., (1989); Yeazell, J. A., Mallalieu M., and Stroud, C. R. (1990); Yeazell, J. A. and Stroud, C. R. (1991)).

Initially, the excited electronic wavepackets 42 and 44 oscillate in phase, however, due to the slight isotopic shift between the energy levels of the two isotopes, the oscillations become out of phase as time elapses. As in the molecular case, one waits a predetermined time interval from the instant that the wavepackets were created by the first laser pulse until the difference in phase between the oscillations between the wavepackets in the two isotopes is a maximum and the wavepackets have undergone substantial revival. At this moment in time a second laser pulse of center frequency $\Omega_2$ is used to ionize one of the isotopes while leaving the other non-ionized. This is possible because a contracted wavepacket has a much greater ionization probability than an expanded one (Wals, J., Fielding, H., Christian, J., Snoek, L., van der Zande W. and van Linden van den Heuvell, H. B. (1994); Wolde, A., ten, Noordam, L. D., Lagendijk A. and van Linden van den Heuvell, H. B. (1988); Yeazell, J. A., Mallalieu, M., Parker, J. and Stroud, C. R., (1989); Yeazell, J. A., Mallalieu M., and Stroud, C. R. (1990); Yeazell, J. A. and Stroud, C. R. (1991)). The ionized isotope may then be extracted by known electromagnetic methods. The predetermined time interval between the application of the first laser pulse and the second laser pulse is determined in the same way as described for the case of molecular isotopes.

Although the present invention has been described with reference to specific example embodiments, it will be appreciated by those skilled in the art that it is not limited to the details of the foregoing illustrated embodiments and that it may be realized in other specific forms without departing from the spirit or essential attributes thereof. The present embodiments are therefore to be considered in all respects as illustrative and not restrictive, the scope of the invention being indicated by the appended claims rather than by the foregoing description, and all changes which fall within the meaning and range of equivalency of the claims are therefore intended to be embraced herein.

I claim:

1. A method for the separation of one isotope from the other isotopes in a gaseous mixture of isotopes comprising the steps of:

non-selectively exciting said gaseous mixture of isotopes by a first laser pulse of a first center frequency and a first duration to form spatially localized wavepackets in said isotopes which initially oscillate in phase with each other;

waiting a predetermined time interval until the oscillations of the wavepacket in said one isotope are substantially out of phase with respect to the oscillations of the wavepackets in said other isotopes and the wavepackets have undergone substantial revival;

selectively exciting, after said predetermined time interval, said one isotope by a second laser pulse of a second center frequency and a second duration; and extracting said selectively excited one isotope by an appropriate extracting technique.

2. The method according to claim 1, wherein said first center frequency is chosen to be resonant to a group of excited quantum states in each of said isotopes.

3. The method according to claim 1, wherein the durations of said first and second laser pulses are much shorter than the periods of oscillation of said wavepackets.

4. The method according to claim 1, wherein said predetermined time interval is determined by the following sequence of operations:

(i) obtaining a value for the time interval required for the formation of a substantial phase difference to be established between the oscillations of the wavepacket in said one isotope and the oscillations of the wavepackets in said other isotopes;

(ii) determining the revival time for the wavepacket in said one isotope;

(iii) finding the location of the time span where both the revival of the wavepackets in said isotopes and said substantial phase difference between the oscillations of said wavepackets occur essentially simultaneously;

(iv) adjusting the center frequency of said second laser pulse to ensure that the absorption of said second laser pulse occurs substantially near one of the classical turning points of the oscillating wavepacket in said one isotope; and (v) determining, in said time span, the time at which the probability of excitation of said wave packet in said one isotope by means of said second laser pulse is essentially maximum.

5. The method of claim 4, further comprising the steps of:

a.1 determining a first signal indicative of the concentration of said extracted one isotope and a second signal indicative of the concentration of said other isotopes as a function of said predetermined time interval;

a.2 adjusting the center frequency of said first laser pulse to achieve a minimum of overlap between the peaks of said first signal and the peaks of said second signal; and a.3 choosing the time at which said second laser pulse is to be emitted as being precisely that time at which a peak in said first signal occurs.

6. The method according to claim 5, wherein said peak in said first signal at which said second laser pulse is to be emitted falls essentially between peaks in said second signal.

7. The method according to claim 1, wherein said gaseous mixture of isotopes comprises two isotopes, a first and a second isotope, the angular frequency of the oscillations, $\omega_1$, of the wavepacket in the first isotope is different in magnitude from the angular frequency of the oscillations, $\omega_2$, of the wavepacket in the second isotope by a quantity $\Delta\omega = |\omega_1 - \omega_2|$ and the angular frequencies of oscillation, $\omega_1$, $\omega_2$ depend on the central energy E of the respective wavepackets.

8. The method according to claim 7, wherein the predetermined time interval $\Delta\tau$, for the oscillations of the wavepackets in the first and second isotopes to be substantially out of phase with each other, while at the same time the wavepackets have undergone substantial revival, and the corresponding energy E, are determined by the following sequence of operations:

(i) obtaining a value for the time interval $\Delta t_s(E)$, required for a substantial phase difference to be formed between the oscillations of the wavepackets in the two isotopes from the equation $$\Delta t_s = \frac{\pi}{\Delta\omega(E)} \ ;$$

(ii) determining the revival time, $T_{rev}(E)$, for the wavepacket in said first isotope from the equation:

$$T_{rev}(E) = \frac{4\pi}{\hbar\omega_1} \left| \frac{d\omega_1(E)}{dE} \right|^{-1},$$

where $\hbar$ is Planck's constant divided by $2\pi$;

(iii) determining the central energy E of the wavepacket in the said one isotope from the equation $$m \frac{T_{rev}(E)}{2} = (2l - 1)\Delta t_s(E),$$

where m and l are integers;

(iv) estimating, from the expression $\Delta\tau \approx (2l-1)\Delta t_s(E)$ the location of that time span where both the revival of the wavepackets of said two isotopes and a substantial phase difference between the oscillations of said wavepackets occur essentially simultaneously.

9. The method according to claim 8, wherein the energy E corresponds to a group of quantum levels with a high probability of optical excitation and the integers m and l take on smallest possible values.

10. The method according to claim 8, wherein the derivative $$\frac{d\omega_1(E)}{dE}$$

can be determined from the dependance of $\omega_1(E)$ for a wavepacket considered as a classical particle with energy $E=E_n$, wherein n is the quantum number of the central energy state of the wavepacket in the said one isotope and $E_n$ is the energy of this state.

11. The method according to claim 9, wherein the derivative can be obtained from the following approximation:

$$\frac{d\omega_1(E)}{dE} \approx \frac{\omega_{n+1,n} - \omega_{n,n-1}}{E_{n+1} - E_n},$$

where $\omega_{n+1,n}=(E_{n+1}-E_n)/\hbar$ is the frequency spacing between adjacent excited quantum levels in said first isotope.

12. The method according to claim 1, wherein said isotopes are molecular isotopes.

13. The method according to claim 1, wherein said wavepackets are vibrational wavepackets.

14. The method according to claim 12, wherein said center frequency of said first laser pulse is in the infrared region and said wavepackets are vibrational wavepackets in the ground molecular electronic state of the isotopes.

15. The method according to claim 12, wherein the center frequency of said second laser pulse is resonant to a transition from the ground potential energy state to a repulsive potential energy state thereby exciting the wavepackets of one of the isotopes in the repulsive potential energy state.

16. The method according to claim 1, wherein said isotopes are atomic isotopes.

17. The method according to claim 16, wherein said first laser pulse creates electronic wavepackets in said isotopes.

18. The method according to claim 17, wherein said second laser pulse ionizes one of the isotopes in said gaseous mixture.

19. The method according to claim 1, wherein said first laser pulse excites said wavepackets in a single photon process.

20. The method according to claim 1, wherein said first laser pulse excites said wavepackets in a multiphoton process.

21. The method according to claim 1, wherein said first laser pulse is shaped so as to excite squeezed wavepackets in said isotopes.

* * * * *